(12) United States Patent
Mo (10) Patent No.: US 12,276,369 B2
(45) Date of Patent: Apr. 15, 2025

(54) DESKTOP DUAL-SCREEN MULTI-DIRECTIONAL ROTATIONAL FOLDING MECHANISM

(71) Applicant: Yeqiong Zou, Xinhua (CN)

(72) Inventor: Weian Mo, Dongguan (CN)

(73) Assignee: Yeqiong Zou, Xinhua County (CN)

(*) Notice: Subject to any disclaimer, the term of this patent is extended or adjusted under 35 U.S.C. 154(b) by 0 days.

(21) Appl. No.: 18/970,788

(22) Filed: Dec. 5, 2024

(65) Prior Publication Data

US 2025/0092985 A1    Mar. 20, 2025

(30) Foreign Application Priority Data

Oct. 24, 2024   (CN) .......................... 202422577861.8

(51) Int. Cl.
*F16M 11/12*   (2006.01)
*F16M 11/20*   (2006.01)

(52) U.S. Cl.
CPC ....... *F16M 11/128* (2013.01); *F16M 11/2085* (2013.01); *F16M 2200/08* (2013.01)

(58) Field of Classification Search
CPC ............. F16M 11/128; F16M 11/2085; F16M 2200/08
See application file for complete search history.

(56) References Cited

U.S. PATENT DOCUMENTS

| | | | | |
|---|---|---|---|---|
| D635,143 S | * | 3/2011 | Derry | D14/451 |
| 9,803,795 B2 | * | 10/2017 | Brandt | G06F 1/1601 |
| 9,958,108 B2 | * | 5/2018 | Bowman | F16M 11/18 |
| 10,991,284 B2 | * | 4/2021 | Chew | G09G 5/00 |
| 2003/0234332 A1 | | 12/2003 | Yen et al. | |
| 2005/0258319 A1 | * | 11/2005 | Jeong | F16M 11/2021 248/176.1 |
| 2008/0006744 A1 | | 1/2008 | Sun | |

(Continued)

OTHER PUBLICATIONS

Ergotron workfit dual hinge bow accessory 2016 datasheet, https://media.ergotron.com/reserved/resources/888-98-047-w-orig.pdf (Year: 2016).*

(Continued)

*Primary Examiner* — Eret C Mcnichols
*Assistant Examiner* — Ding Y Tan (57) ABSTRACT

A desktop dual-screen multi-directional rotational folding mechanism is provided. The desktop dual-screen multi-directional rotational folding mechanism includes a bottom support assembly, a side extension assembly arranged on the bottom support assembly, and rotating assemblies arranged on the side extension assembly. A reinforcing plate is also fixed to the fixed beam, and the reinforcing plate is provided with an inner skeleton. The side extension assembly includes a buckle plate, a pressure-bearing housing fixed to one end, away from the outer skeleton, of the buckle plate, and a positioning plate fixed to one end, of the pressure-bearing housing. According to the desktop dual-screen multi-directional rotational folding mechanism, the position of a display screen is adjustable. Therefore, the desktop dual-screen multi-directional rotational folding mechanism is adapted to the usage requirements in more scenarios, and may adapt different sizes of display screens, so that the scope of application is increased.

7 Claims, 6 Drawing Sheets

(56) References Cited

U.S. PATENT DOCUMENTS

| | | | | |
|---|---|---|---|---|
| 2008/0225472 | A1* | 9/2008 | Chih | F16M 11/24 |
| | | | | 361/679.04 |
| 2010/0128423 | A1* | 5/2010 | Moscovitch | H04N 5/64 |
| | | | | 361/679.01 |
| 2011/0155869 | A1* | 6/2011 | Chen | F16M 11/2021 |
| | | | | 248/125.8 |
| 2019/0374025 | A1* | 12/2019 | Bowman | A47B 21/02 |

OTHER PUBLICATIONS

Innovative Office Products Switch configurable multi-monitor mounting system product 2014 catalog https://www.thehumansolution.com/content/innovative-switch-monitor-arm-brochure.pdf?srsltid=AfmBOopD0MRebhGo9jJPcAWtZ1P1uHUPWqV754_F36iV95Y4HROxAAG3 (Year: 2014).*

* cited by examiner

DESKTOP DUAL-SCREEN MULTI-DIRECTIONAL ROTATIONAL FOLDING MECHANISM

TECHNICAL FIELD

The present disclosure relates to a rotating folding mechanism, in particular to a desktop dual-screen multi-directional rotational folding mechanism.

BACKGROUND

The display screen is one of the components of a desktop computer. The display screen is usually placed on the desktop when used. When a user needs dual-screen assembly, a dual-screen rotational folding mechanism generally may be used cooperatively, so that the desktop space is saved. However, the length of the transverse support beam on the current dual-screen rotational folding mechanism is not easy to adjust, resulting in that the position of the display screen in the horizontal direction is not adjustable. Only the display screen with a specified size may be supported, resulting in a smaller scope of application.

SUMMARY

The present disclosure aims to provide a desktop dual-screen multi-directional rotational folding mechanism, so that the position of a display screen is adjustable. Therefore, the desktop dual-screen multi-directional rotational folding mechanism is adapted to the usage requirements in more scenarios, and may adapt different sizes of display screens, so that the scope of application is increased.

In order to achieve the above-mentioned purpose, the present disclosure provides the following technical scheme. A desktop dual-screen multi-directional rotational folding mechanism includes a bottom support assembly, a side extension assembly arranged on the bottom support assembly, and rotating assemblies arranged on the side extension assembly. The side extension assembly is fixed to two screen assemblies simultaneously through the rotating assemblies. The bottom support assembly includes a base, a fixed beam fixed to an upper end face of the base, and an outer skeleton fixed to the fixed beam. A reinforcing plate is also fixed to the fixed beam, and the reinforcing plate is provided with an inner skeleton. The side extension assembly includes a buckle plate, a pressure-bearing housing fixed to one end, away from the outer skeleton, of the buckle plate, and a positioning plate fixed to one end, away from the buckle plate, of the pressure-bearing housing. The buckle plate is fixed to the outer skeleton. The positioning plate is provided with two parallel side extension beams laminated to each other. Each of the two side extension beams is provided with a regulating tank. One end, away from the positioning plate, of each of the two side extension beams is provided with a fastener plate. A plurality of installation columns are fixed to one end, close to the side extension beam, of the fastener plate. The installation columns pass through the regulating tanks in the two side extension beams and are fixed to the positioning plate.

Preferably, the base is provided with external interfaces and a power interface. The external interfaces and the power interface are all located at the back of the base. The external interfaces include HDMI interfaces (High-Definition Multimedia Interfaces), TYPE-C interfaces and other common interfaces.

Preferably, the number of the regulating tanks in the side extension beam is two, and the two regulating tanks are arranged horizontally.

Preferably, a plurality of installation holes are formed in one end, close to the fastener plate, of the positioning plate, and the installation columns are fittingly inserted into the installation holes respectively and fixedly connected with the positioning plate, so that the two side extension beams may be firmly fixed between the positioning plate and the fastener plate without shaking.

Preferably, the number of the rotating assemblies is two, and the two rotating assemblies are respectively arranged on the two side extension beams. The rotating assembly includes a connecting plate, a support plate fixed to the connecting plate, and a positioning seat installed on the support plate. A reinforcing rib plate is fixed to one end, away from the support plate, of the connecting plate, and the reinforcing rib plate is fixedly connected with the support plate, so that the support plate is reinforced.

Preferably, one end, away from the fastener plate, of the side extension beam is fixedly connected with a reinforcing sleeve, and the reinforcing sleeve is rotationally connected into the connecting plate, so that the connecting plate may rotate along with the side extension beam, and then the overturning of the screen assembly is driven.

Preferably, the screen assembly includes a frame, and one end, away from the side extension assembly, of the frame is provided with a display screen. One end, away from the display screen, of the frame is fixed to the positioning seat.

Compared with the prior art, the present disclosure has the following beneficial effects. According to the desktop dual-screen multi-directional rotational folding mechanism, the two side extension beams are provided with the regulating tanks. The relative positions of the two side extension beams are adjustable through the regulating tanks, so that the positions of the two screen assemblies are adjustable. Therefore, the desktop dual-screen multi-directional rotational folding mechanism is adapted to the usage requirements in more scenarios, and may adapt different sizes of display screens, so that the scope of application is increased. The two screen assemblies are supported at the same time through one bottom support assembly, so that a dual-screen form is realized, and the occupied space of the bottom support assembly on the desktop is small, so that the desktop space is saved.

Reference signs and names in the figures: 1, bottom support assembly; 11, base; 12, external interface; 13, power interface; 14, fixed beam; 15, outer skeleton; 2, side extension assembly; 21, buckle plate; 22, pressure-bearing housing; 23, positioning plate; 24, installation hole; 25, side extension beam; 26, regulating tank; 27, reinforcing sleeve;

28, fastener plate; 29, installation column; 3, rotating assembly; 31, connecting plate; 32, reinforcing rib plate; 33, support plate; 34, positioning seat; 4, screen assembly; 41, frame; and 42, display screen.

DETAILED DESCRIPTION OF THE EMBODIMENTS

The technical schemes according to embodiments of the present disclosure are clearly and completely described in the following with reference to the attached figures in the present disclosure. Apparently, the embodiments in the following description are merely a part rather than all of the embodiments of the present disclosure. Based on the embodiment in the present disclosure, all other embodiments obtained by the ordinary technical staff in the art under the premise of without contributing creative labor belong to the scope protected by the present disclosure.

In the description of the embodiments of the present disclosure, it needs to be illustrated that the indicative direction or position relations of the terms such as "length", "width", "upper", "lower", "front", "rear", "left", "right", "vertical", "horizontal", "top", "bottom", "inside" and "outside" are direction or position relations illustrated based on the attached figures, just for facilitating the description of the embodiments of the present disclosure and simplifying the description, but not for indicating or hinting that the indicated device or element must be in a specific direction and is constructed and operated in the specific direction, the terms cannot be understood as the restriction of the present disclosure. In addition, the terms "first" and "second" are merely intended for a purpose of description, and shall not be understood as an indication or implication of relative importance or implicit indication of the number of indicated technical features. Therefore, a feature limited by "first" or "second" may explicitly or implicitly include one or more features. In the description of the present disclosure, "a plurality of" means two or more unless expressly specifically defined otherwise.

In the embodiment of the present disclosure, except as otherwise noted, the terms such as "install", "link" and "connect" should be generally understood, for example, the components can be fixedly connected, and also can be detachably connected or integrally connected; the components can be mechanically connected, and also can be electrically connected; the components can be directly connected and also can be indirectly connected through an intermediate, and two components can be communicated internally or interact with each other. For those skilled in the art, the specific meanings of the terms in the embodiments of the present disclosure can be understood according to specific conditions.

Figure 1:
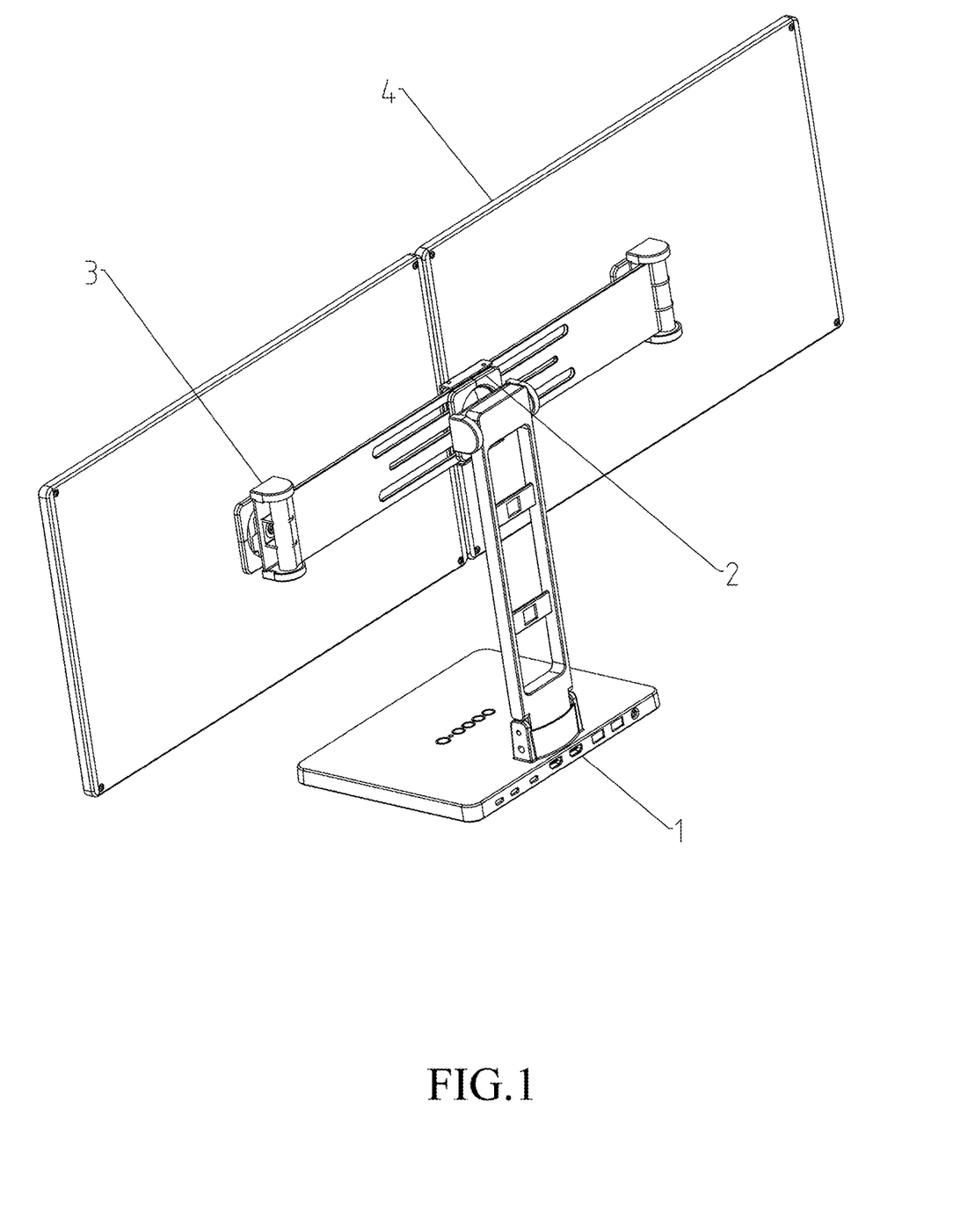
FIG. 1 is a first schematic diagram in embodiments of the present disclosure.

Referring to FIG. 1, in an embodiment provided by the present disclosure, a desktop dual-screen multi-directional rotational folding mechanism includes a bottom support assembly 1, a side extension assembly 2 arranged on the support assembly 1, and rotating assemblies 3 arranged on the side extension assembly 2. The number of the rotating assemblies 3 is two, and the side extension assembly 2 is fixed to two screen assemblies 4 through the two rotating assemblies 3.

Figure 2:
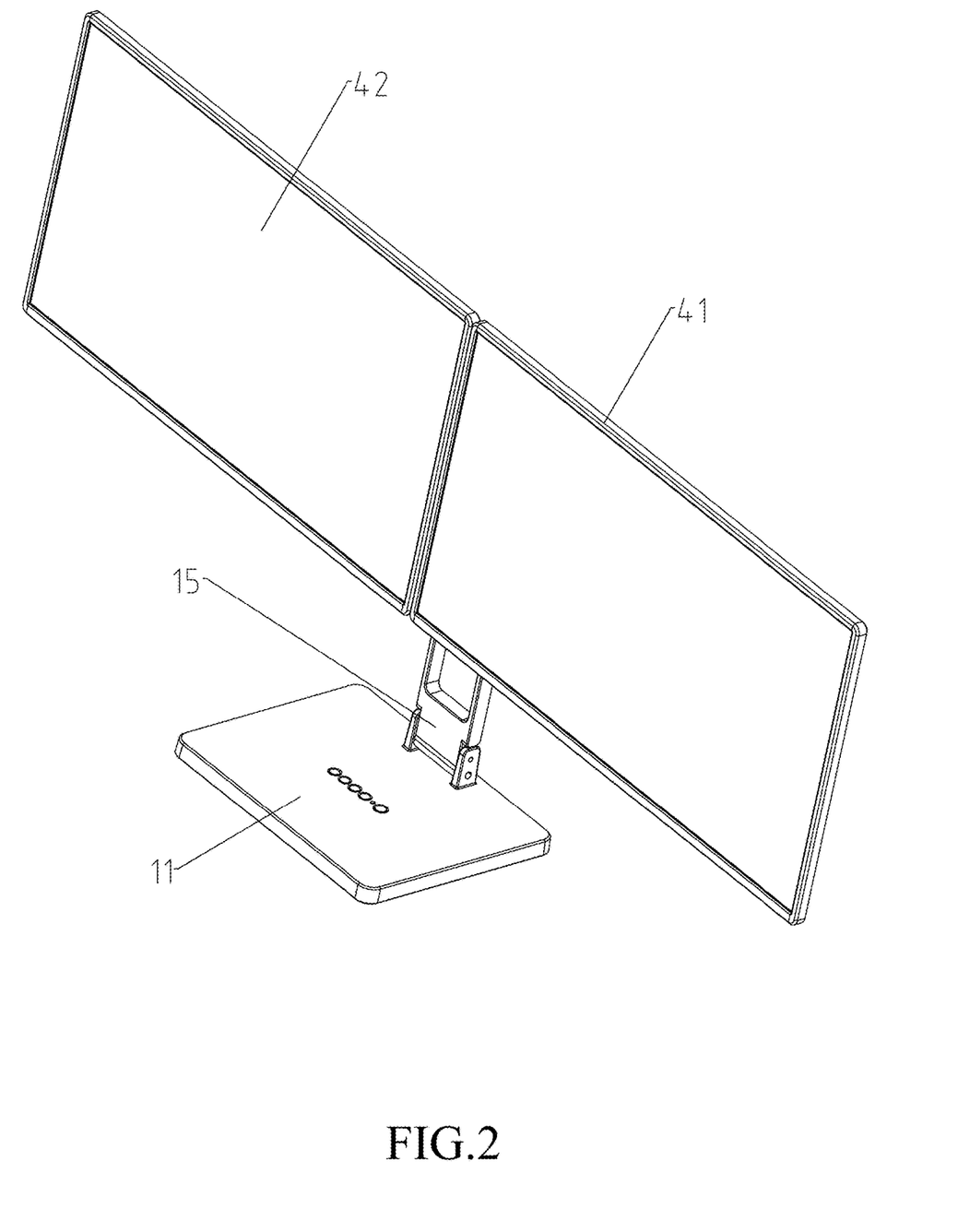
FIG. 2 is a second schematic diagram in embodiments of the present disclosure.

Referring to FIG. 2, the screen assembly 4 includes a frame 41, and one end, away from the side extension assembly 2, of the frame 41 is provided with a display screen 42.

Figure 3:
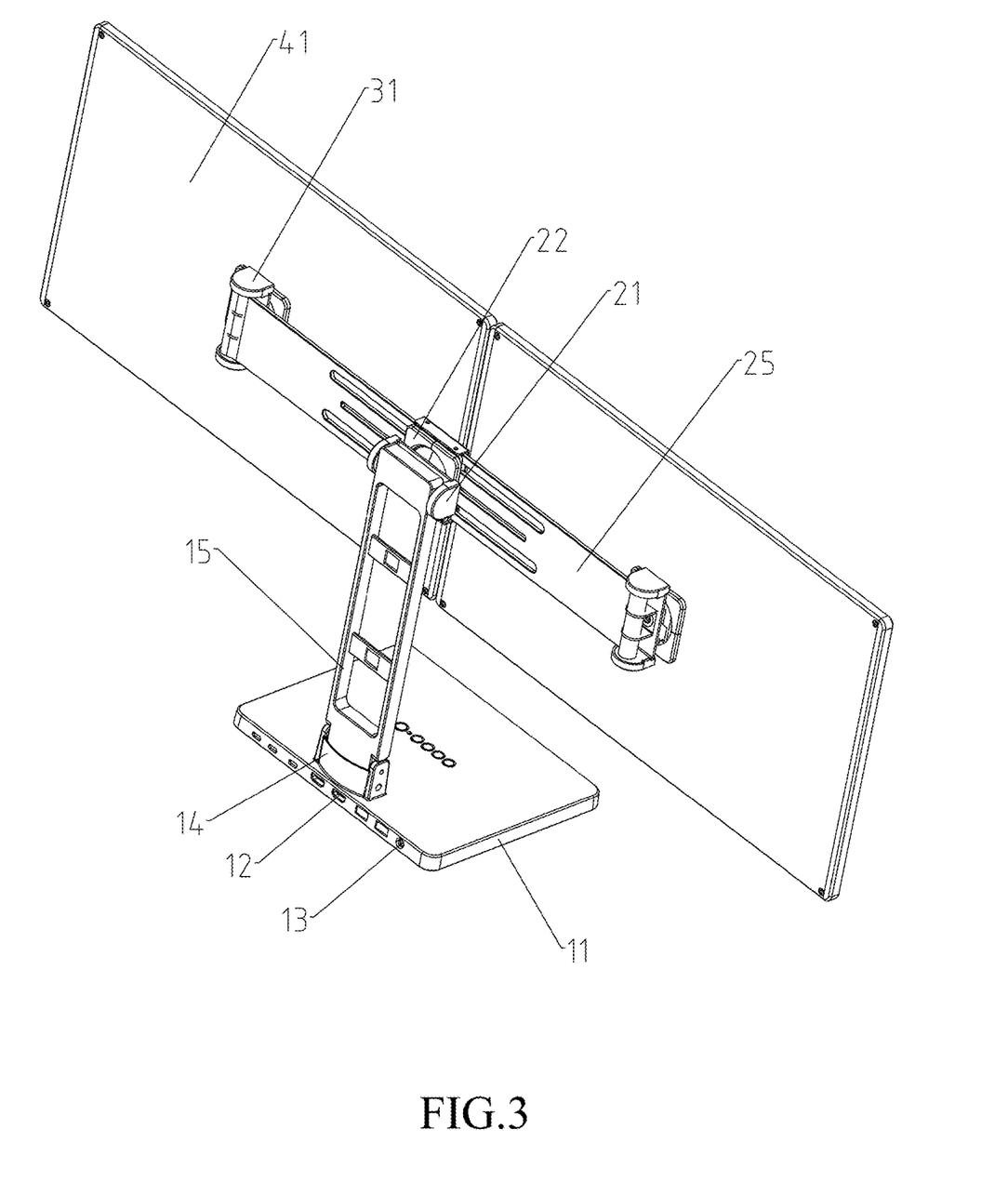
FIG. 3 is a third schematic diagram in embodiments of the present disclosure.
Figure 4:
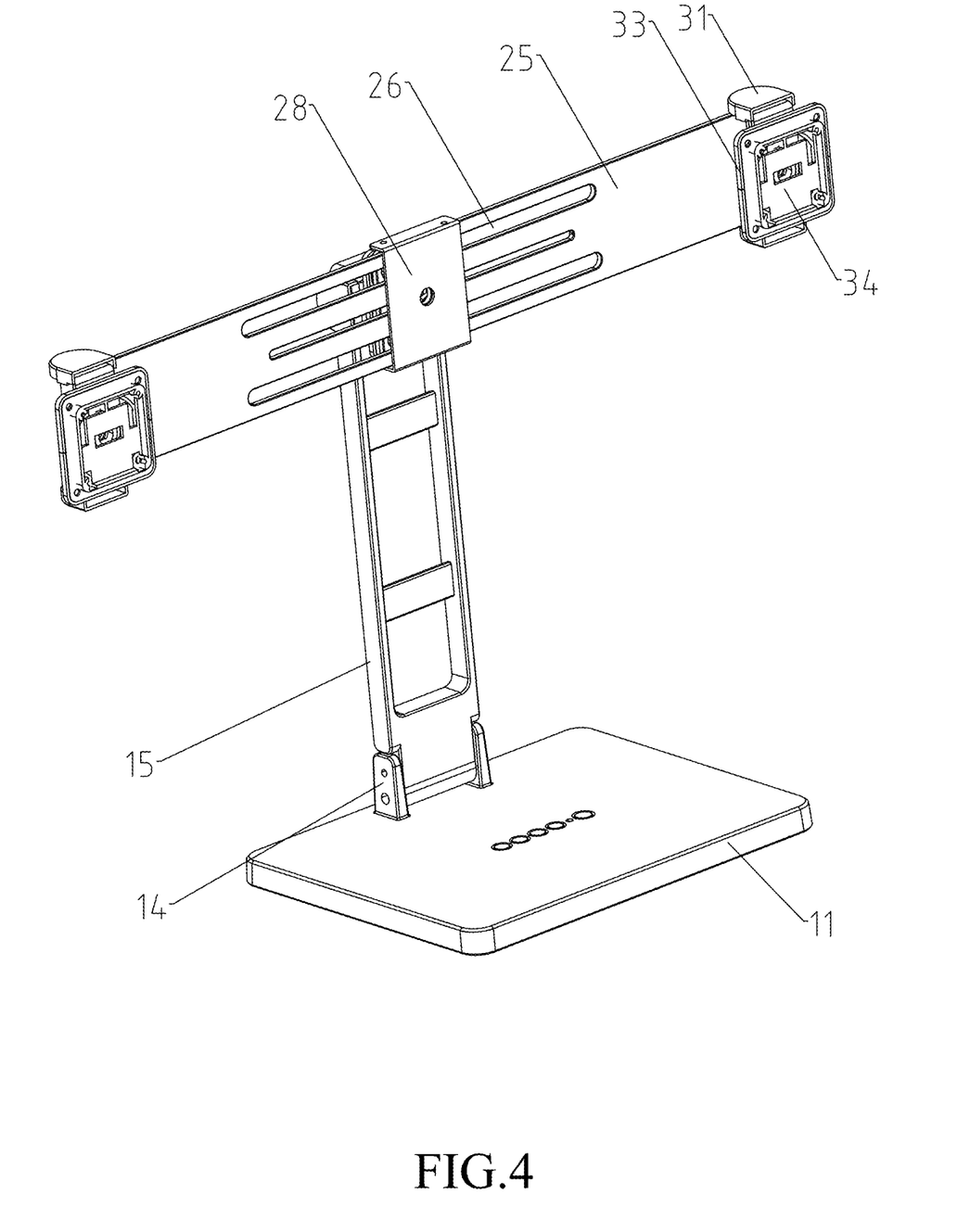
FIG. 4 is a structural schematic diagram of a bottom support assembly, a side extension assembly and a rotating assembly in the present disclosure.

Referring to FIG. 3 to FIG. 4, the bottom support assembly 1 includes a base 11, a fixed beam 14 fixed to an upper end face of the base 11, and an outer skeleton 15 fixed to the fixed beam 14. The base 11 is provided with external interfaces 12 and a power interface 13. The external interfaces 12 and the power interface 13 are all located at the back of the base 11. The external interfaces 12 include HDMI interfaces, TYPE-C interfaces and other common interfaces.

Figure 5:
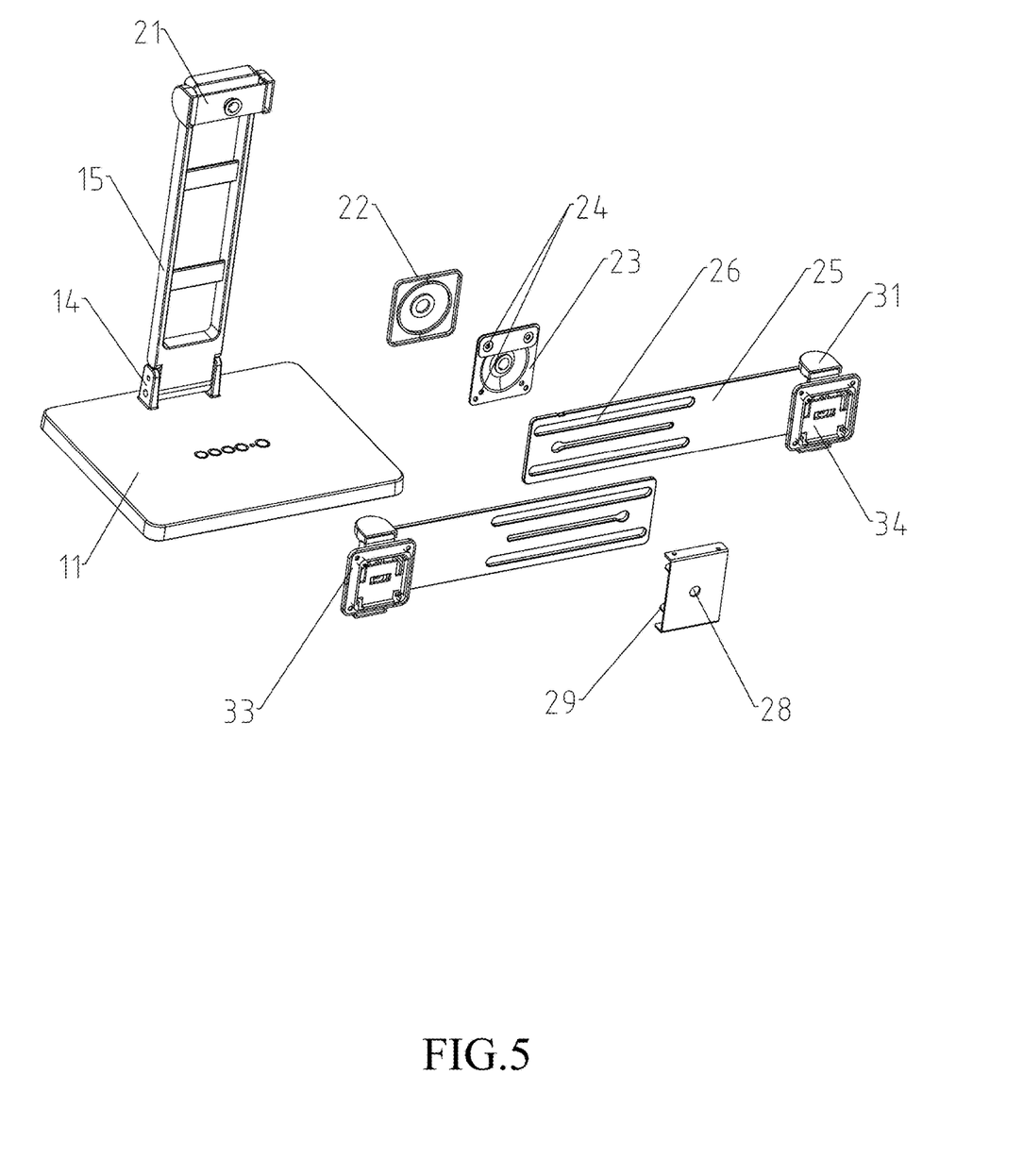
FIG. 5 is an explosive view of a side extension assembly and a rotating assembly in the present disclosure.

Referring to FIG. 5, the side extension assembly 2 includes a buckle plate 21, a pressure-bearing housing 22 fixed to one end, away from an outer skeleton 15, of the buckle plate 21, and a positioning plate 23 fixed to one end, away from the buckle plate 21, of the pressure-bearing housing 22. The buckle plate 21 is fixed to the outer skeleton 15. A plurality of installation holes 24 are formed in one end, close to a fastener plate 28, of the positioning plate 23. The positioning plate 23 is provided with two parallel side extension beams 25 laminated to each other. Each of the two side extension beams 25 is provided with a regulating tank 26. The number of the regulating tanks in the side extension beam 25 is two, and the two regulating tanks 26 are arranged horizontally. One end, away from the positioning plate 23, of each of the two side extension beams 25 is provided with a fastener plate 28. A plurality of installation columns 29 are fixed to one end, close to the side extension assembly 25, of the fastener plate 28. The installation columns 29 pass through the regulating tanks 26 in the two side extension beams 25 and are fixed to the positioning plate 23. The installation columns 29 are fittingly inserted into the installation holes 24 respectively and fixedly connected with the positioning plate 23, so that the two side extension beams 25 may be firmly fixed between the positioning plate 23 and the fastener plate 28 without shaking.

Figure 6:
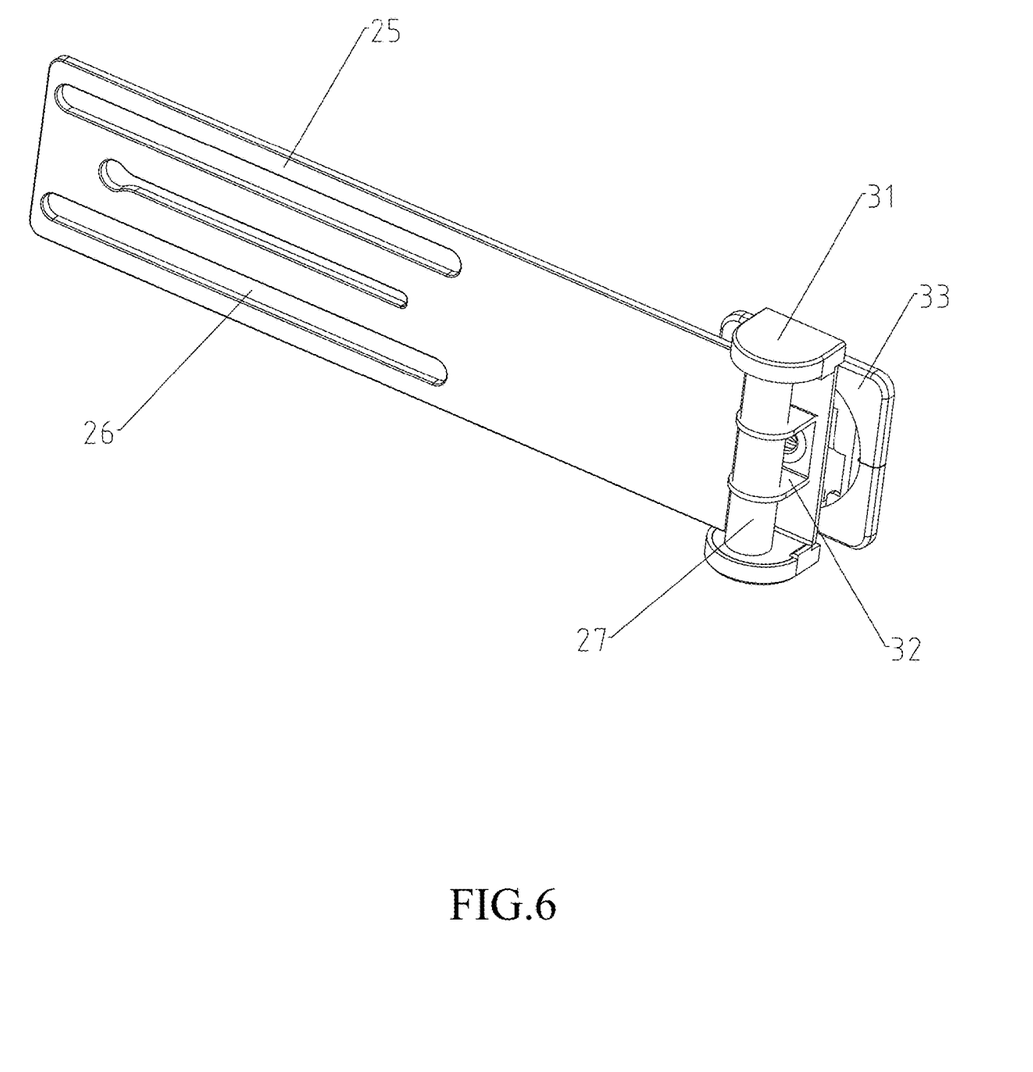
FIG. 6 is a structural schematic diagram of a side extension beam in the present disclosure.

Referring to FIG. 5 to FIG. 6, the two rotating assemblies 3 are respectively arranged on the two side extension beams 25. The rotating assembly 3 includes a connecting plate 31, a support plate 33 fixed to the connecting plate 31, and a positioning seat 34 installed on the support plate 33. A reinforcing rib plate 32 is fixed to one end, away from the support plate 33, of the connecting plate 31. The reinforcing rib plate 32 is fixedly connected with the support plate 33, so that the support plate 33 is reinforced. One end, away from the fastener plate 28, of the side extension beam 25 is fixedly connected with a reinforcing sleeve 27, and the reinforcing sleeve 27 is rotationally connected into the connecting plate 31, so that the connecting plate 31 may rotate along with the side extension beam 25, and then the overturning of the screen assembly 4 is driven. One end, away from the display screen 42, of the frame 41 is fixed to the positioning seat 34, so that the frame 41 keeps stable in practical use.

During the operation of the mechanism, when in use, the two frames 41 are respectively installed on the two positioning seats 34 (the installation method is the prior art, such as fixation through VESA holes), and then the two display screens 42 may be used at the same time in a state of keeping parallel and equal height, so that two screen assemblies 4 may be supported at the same time by only one bottom support assembly 1, and the desktop space is saved. The side extension assembly 2 is supported by the outer skeleton 15, so that the side extension assembly 2 and all structure (including the rotating assembly 3 and the screen assembly 4) on the side extension assembly 2 are more stable. When the positions of the two screen assemblies 4 need to be adjusted, the two side extension beams 25 can be translated on the fastener plate 28, so that the positions of the installation columns 29 in the two regulating tanks 26 are changed accordingly, then the positions of the two reinforcing sleeves 27 are adjusted, and then the position of the screen assembly 4 is adjusted, so that the mechanism adapts to different screen assemblies 4.

For those skilled in the art, obviously the present disclosure is not limited to the details of the exemplary embodiment, and the present disclosure can be achieved in other specific forms without departing from the spirit or essential characteristics of the present disclosure. Therefore, for every point, the embodiments should be regarded as exemplary embodiments and are unrestrictive, the scope of the present disclosure is restricted by the claims appended hereto, and therefore, all changes, including the meanings and scopes of equivalent elements, of the claims are aimed to be included in the present disclosure. Any mark of attached figures in the claims should not be regarded as limitation to the involved claims.

What is claimed is:

1. A desktop dual-screen multi-directional rotational folding mechanism, comprising a bottom support assembly (1), a side extension assembly (2) arranged on the bottom support assembly (1), and rotating assemblies (3) arranged on the side extension assembly (2), and the side extension assembly (2) being fixed to two screen assemblies (4) simultaneously through the rotating assemblies (3), wherein the bottom support assembly (1) comprises a base (11), a fixed beam (14) fixed to an upper end face of the base (11), and an outer skeleton (15) fixed to the fixed beam (14), the side extension assembly (2) comprises a buckle plate (21), a pressure-bearing housing (22) fixed to one end, away from the outer skeleton (15), of the buckle plate (21), and a positioning plate (23) fixed to one end, away from the buckle plate (21), of the pressure-bearing housing (22), the buckle plate (21) is fixed to the outer skeleton (15), the positioning plate (23) is provided with two parallel side extension beams (25) laminated to each other, each of the two side extension beams (25) is provided with a regulating tank (26), one end, away from the positioning plate (23), of each of the two side extension beams (25) is provided with a fastener plate (28), a plurality of installation columns (29) are fixed to one end, close to the side extension beam (25), of the fastener plate (28), and the installation columns (29) pass through the regulating tanks (26) in the two side extension beams (25) and are fixed to the positioning plate (23).

2. The desktop dual-screen multi-directional rotational folding mechanism according to claim 1, wherein the base (11) is provided with external interfaces (12) and a power interface (13).

3. The desktop dual-screen multi-directional rotational folding mechanism according to claim 1, wherein the number of the regulating tanks (26) in the side extension beam (25) is two, and the two regulating tanks (26) are arranged horizontally.

4. The desktop dual-screen multi-directional rotational folding mechanism according to claim 1, wherein a plurality of installation holes (24) are formed in one end, close to the fastener plate (28), of the positioning plate (23), and the installation columns (29) are fittingly inserted into the installation holes (24) respectively and fixedly connected with the positioning plate (23).

5. The desktop dual-screen multi-directional rotational folding mechanism according to claim 1, wherein the number of the rotating assemblies (3) is two, the two rotating assemblies (3) are respectively arranged on the two side extension beams (25), the rotating assembly (3) comprises a connecting plate (31), a support plate (33) fixed to the connecting plate (31), and a positioning seat (34) installed on the support plate (33), a reinforcing rib plate (32) is fixed to one end, away from the support plate (33), of the connecting plate (31), and the reinforcing rib plate (32) is fixedly connected with the support plate (33).

6. The desktop dual-screen multi-directional rotational folding mechanism according to claim 5, wherein one end, away from the fastener plate (28), of the side extension beam (25) is fixedly connected with a reinforcing sleeve (27), and the reinforcing sleeve (27) is rotationally connected into the connecting plate (31).

7. The desktop dual-screen multi-directional rotational folding mechanism according to claim 1, wherein the screen assembly (4) comprises a frame (41), and one end, away from the side extension assembly (2), of the frame (41) is provided with a display screen (42).

* * * * *